(12) United States Patent
Zhang

(10) Patent No.: US 7,706,793 B2
(45) Date of Patent: Apr. 27, 2010

(54) OPTIMIZED INTERACTION METHOD OF USER TERMINAL SELECTING ACCESS MOBILE NETWORK IN WIRELESS LOCAL AREA NETWORK

(75) Inventor: Wenlin Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 584 days.

(21) Appl. No.: 10/566,436

(22) PCT Filed: Jul. 23, 2004

(86) PCT No.: PCT/CN2004/000854

§ 371 (c)(1),
(2), (4) Date: Mar. 23, 2007

(87) PCT Pub. No.: WO2005/011305

PCT Pub. Date: Feb. 3, 2005

(65) Prior Publication Data

US 2007/0189241 A1    Aug. 16, 2007

(30) Foreign Application Priority Data

Jul. 31, 2003    (CN) .............................. 03 1 49952

(51) Int. Cl.
*H04W 4/00* (2006.01)
(52) U.S. Cl. .................... 455/435.2; 455/434; 455/436; 370/328; 370/331
(58) Field of Classification Search ................ 455/426, 455/433, 436, 434, 435.2; 370/328, 331
See application file for complete search history.

(56) References Cited

U.S. PATENT DOCUMENTS

| 7,028,097 | B2 * | 4/2006 | Bard ........................... 709/232 |
| 7,068,610 | B2 * | 6/2006 | Unruh ......................... 370/252 |
| 7,324,478 | B2 * | 1/2008 | Park et al. ................... 370/331 |
| 7,359,718 | B2 * | 4/2008 | Tao et al. .................. 455/456.5 |
| 2002/0032024 | A1 | 3/2002 | Namba |
| 2003/0119481 | A1 | 6/2003 | Haverinen |
| 2003/0176188 | A1 * | 9/2003 | O'Neill ....................... 455/433 |
| 2004/0029580 | A1 * | 2/2004 | Haverinen et al. ........ 455/426.1 |
| 2004/0066756 | A1 * | 4/2004 | Ahmavaara et al. ......... 370/328 |
| 2004/0103282 | A1 * | 5/2004 | Meier et al. ................. 713/171 |
| 2005/0254469 | A1 * | 11/2005 | Verma et al. ................ 370/338 |
| 2005/0272465 | A1 * | 12/2005 | Ahmavaara et al. ...... 455/552.1 |

FOREIGN PATENT DOCUMENTS

| CN | 1352864 A | 6/2002 |
| CN | 1356004 A | 6/2002 |
| JP | 2001-111575 | 4/2001 |
| JP | 2003134151 | 5/2003 |

OTHER PUBLICATIONS

Draft 3GPP TS 23.234 v1.10.0; 3rd Generation Partnership Project; Technical Specification Group Services and System Aspects; 3GPP system to Wireless Local Area Network (WLAN) Interworking; System Description (Release 6); May 2003 (http://www.3gpp.org/ftp/Specs/archive/23_series/23.234/23234-1a0.zip).

WLAN Network selection advertisement procedure, Tdoc S2-32466, Jul. 11, 2003 (http://www.3gpp.ord/ftp/tsg_sa/WG2_Arch/TSGS2_33_Sophia_Antipolis/tdocs/S2-032466.zip).

Decision of Refusal from Japanese Patent Office for Japanese Patent Application No. 2006-521374, Oct. 6, 2009, 6 pages.

European Office Action for Application No. 04 762 001.8 - 2412, dated Sep. 25, 2006, 5 pages.

Communication of a Notice of Opposition from the European Patent Office for Application No. 04762001.8,dated Oct. 24, 2008, 6 pages. Including Appendix from Al-A10.

3rd Generation Partnership Project; Technical Specification Group Services and System Aspects; 3GPP system to Wireless Local Area Network (WLAN) Interworking System Description (Release 6). 3GPP TS 23.234 V1.12.0 (2003-07) Technical Specification, 80 pages..

* cited by examiner

*Primary Examiner*—Lester Kincaid
*Assistant Examiner*—Isaak R Jama
(74) *Attorney, Agent, or Firm*—Finnegan, Henderson, Farabow, Garrett & Dunner LLP

(57) ABSTRACT

The present invention relates to an optimized interaction method of a WLAN user terminal selecting an access mobile communication network. In this method, after a wireless connection between the WLAN user terminal and a WLAN access network is established, the WLAN access network or the WLAN user terminal initiates an access authentication procedure, and the WLAN access network sends a user identity request message to the WLAN user terminal. After receiving the user identity request message, the WLAN user terminal determines network selection information to be currently carried according to a detecting result of whether the WLAN access network is changed or according to user selection information, and returning a message containing the determined network selection information to the WLAN access network. The WLAN access network then judges whether the network selection information in the received message indicates one of the mobile communication operation networks to which the WLAN access network is currently connected; if so, sends an access authentication request from the WLAN user terminal to a mobile communication operation network indicated in the network selection information, otherwise, the network sends a notification signaling to the WLAN user terminal, the WLAN user terminal completes subsequent operations according to contents in the notification signaling. With the present invention, when being accessed to a WLAN that is connected to multiple mobile communication operation networks, the WLAN user terminal is capable of selecting an optimal mobile communication operation network to access according to the requirements.

29 Claims, 6 Drawing Sheets

OPTIMIZED INTERACTION METHOD OF USER TERMINAL SELECTING ACCESS MOBILE NETWORK IN WIRELESS LOCAL AREA NETWORK

CROSS-REFERENCE TO RELATED APPLICATIONS

This application claims priority to Patent Cooperation Treaty (PCT) Application No. PCT/CN2004/000854 filed Jul. 23, 2004, entitled, A OPTIMIZATION MUTUAL METHOD OF THE USER TERMINAL SELECT ACCESSING MOBILE NETWORK IN WLAN, which claims priority to Chinese Patent Application Serial No. 03149952 filed Jul. 31, 2003, all of the disclosure of which is hereby incorporated by reference in its entirety.

FIELD OF THE TECHNOLOGY

The present invention relates to network access technique, more particularly to an optimized interaction method of a user terminal selecting an optimal access mobile communication operation network in a Wireless Local Area Network (WLAN).

BACKGROUND OF THE INVENTION

With the user's higher and higher requirements for wireless access rate, WLAN which can provide high-rate data access in a small area is being developed. WLAN includes various different techniques, and at present a widely applied technical standard is IEEE 802.11b, which adopts 2.4 GHz frequency channel and can reach a highest data transmission rate as 11 Mbps. IEEE 802.11g and Bluetooth technique also use this frequency channel, and IEEE 802.11g can reach the highest data transmission rate as 54 Mbps. Other new techniques, such as IEEE 802.11a and ETSI BRAN Hiperlan2, utilize the frequency channel of 5 GHz, and the highest data transmission rate can also be 54 Mbps.

Although there are various different wireless access techniques, most of WLANs are used to transmit Internet Protocol (IP) data packets. In a wireless IP network, the adopted specific WLAN access technique is generally transparent to the upper IP. In the WLAN access technique, WLAN user terminal's wireless access is implemented. by using an Access Point (AP), and an IP transmission network is established by means of network control and connection of connection equipments.

With the popularization and development of WLAN techniques, intercommunication between WLAN and various wireless mobile communication networks, such as Global System for Mobile Communications (GSM), Code Division Multiple Access (CDMA) system, Wideband CDMA (WCDMA) system, Time Division-Synchronous CDMA (TD-SCDMA) system or CDMA2000 system, is becoming the focus of current research. In the $3^{rd}$ Generation Partner Project (3GPP) Organization for Standardization, it is prescribed that a WLAN user terminal can be connected to the Internet or Intranet via a WLAN access network, and can also be connected to a home network of 3GPP system or a visited network of 3GPP system via a WLAN access network. Specifically speaking, a WLAN user terminal is connected to a 3GPP home network via a WLAN access network in the case of local access, as shown in FIG. 2; when the WLAN user terminal is roaming, as shown in FIG. 1, a WLAN user terminal is connected to a 3GPP visited network via a WLAN access network, and part of the entities in the 3GPP visited network are respectively connected to corresponding entities in the 3GPP home network. For example, a 3GPP Authentication Authorization Accounting (AAA) agent in the 3GPP visited network is connected to a 3GPP AAA server in the 3GPP home network, a WLAN Access Gateway (WAG) in the 3GPP visited network is connected to a Packet Data Gateway (PDG) in the 3GPP home network, etc. Here, FIG. 1 and FIG. 2 are schematic diagrams illustrating the framework for intercommunication between a WLAN system and a 3GPP system in case of roaming and non-roaming respectively.

With reference to FIGS. 1 and 2, it can be seen a 3GPP system mainly includes a Home Subscriber Server (HSS)/Home Location Register (HLR), a 3GPP AAA server, a 3GPP AAA agent, a WAG, a PDG, a Charging Gateway (CGw)/Charging Collection Function (CCF) and an Online Charging System (OCS). WLAN user terminals, all entities of a WLAN access network and a 3GPP system jointly constitute a 3GPP-WLAN interaction network, which can be taken as a WLAN service system. Here, the 3GPP AAA server is responsible for implementing authentication, authorization and accounting for users, collecting and transferring charging information from the WLAN access network to the charging system. The PDG takes charge of transmitting user data from the WLAN access network to the 3GPP network or other packet networks. The charging system is mainly in charge of receiving and recording user charging information from the network. The OCS is in charge of instructing the network to periodically transmit online charging information according to charging situation of online charged users, as well as in charge of statistics and control.

In case of non-roaming, when a WLAN user terminal expects to be directly accessed to Internet/Intranet, the WLAN user terminal can be accessed to Internet/Intranet via a WLAN access network after finishing access authentication and authorization with an AAA server (AS) via the WLAN access network. If the WLAN user terminal also expects to access 3GPP Packet Switch (PS) domain service, it can further apply to 3GPP home network for Scenario3 service, namely, the WLAN user terminal requests AS of 3GPP home network for Scenario3 service authorization, the AS of 3GPP home network performs service authentication and authorization upon this service authorization request, if successful, the AS will send an access allowance message to the WLAN user terminal and allocate corresponding PDG for the WLAN user terminal, thereby the WLAN user terminal can access 3GPP PS domain service after the channel between the WLAN user terminal and the allocated PDG is established. Meanwhile, the CGw/CCF and the OCS record charging information according to network utilization situation of the WLAN user terminal. In case of roaming, when a WLAN user terminal expects to be directly accessed to Internet/Intranet, the WLAN user terminal can apply to 3GPP home network for accessing the Internet/Intranet via a 3GPP visited network. If the WLAN user terminal also expects to further apply for Scenario3 service and access 3GPP Packet Switch (PS) domain service, the WLAN user terminal needs to initiate a service authorization procedure towards the 3GPP home network through the 3GPP visited network. The procedure is also performed between the WLAN user terminal and the AS of 3GPP home network. If the authorization is successful, the AS will allocate corresponding home PDG for the WLAN user terminal, thereby the WLAN user terminal can access 3GPP PS domain service after the channel between the WLAN user terminal and the allocated PDG is established.

As shown in FIG. 3, in a 3GPP-WLAN intercommunication network, if a WLAN is connected to multiple 3GPP visited networks which mean Visited Public Land Mobile Networks (VPLMNs), namely multiple mobile communication operation networks, at the same time, the WLAN user terminal will select a desirable VPLMN network after being accessed to this WLAN. For example, in China, a WLAN access network is connected to both VPLMN operation networks of China Mobile and China Unicom at the same time, then, a user of China Unicom needs to instruct WLAN access network to access VPLMN operation network of China Unicom when accessed to WLAN.

Taking another example, a French user roams to a certain WLAN in China, if this French user's home network has roaming protocols with both China Mobile and China Unicom, in case of the WLAN access network being connected to both China Mobile and China Unicom, this French user needs to select a VPLMN network to access after being accessed to the WLAN. Regarding how a WLAN user terminal selects a desirable access network and notifies WLAN access network of the information of the network selected by itself, as well as how the 3GPP-WLAN intercommunication network performs the interaction according to information of the network information selected by the WLAN user terminal, a resolving scheme has been put forward in another patent application whose basic idea is that a WLAN user terminal transmits network selection information to a WLAN access network by means of an access authentication request, the WLAN access network identifies the desirable mobile communication operation network to be accessed by the WLAN user terminal according to the carried network selection information and connects the current WLAN user terminal to the selected network for access authentication and subsequent operations.

However, it will consume a great amount of network resources if a WLAN user terminal selects a network every time. For instance, under the condition that a user is roaming in another place and the user's home mobile communication operation network is not directly connected to the WLAN access network in which the user is currently located, if the WLAN user terminal notifies the WLAN access work of the user's home network as initially selected network every time, every access will trigger the network selection procedure, thereby the WLAN network sends network selection information to this WLAN user terminal and this WLAN user terminal will access this selected network after judging and selecting, leading to network consumption and delay of user's access. However, if the last selected mobile communication operation network is simply adopted, as for a WLAN user terminal that has entered a new WLAN network, it may not be guaranteed that current selected network is the optimal PLMN network of this WLAN user terminal. In other words, when a WLAN user terminal is located in a new WLAN network, although the default mobile communication operation network to access or the previously selected mobile communication operation network has roaming relation with the visited network of this WLAN user terminal and may be available, this new WLAN network in which this WLAN user terminal is currently located may be directly connected to a Home Public Land Mobile Network (HPLMN) or other better VPLMNs. In such a case, since there is already default or selected mobile communication operation network for routing, new network selection is not allowed, therefore, it is not guaranteed that the WLAN user terminal can select the optimal PLMN network for the current WLAN network, such as a HPLMN. So far no one has put forward a specific resolving scheme in terms of the problem as, when a WLAN user terminal is located in a new WLAN, how to guarantee the WLAN user terminal to select a proper optimal mobile communication operation network at any time if a WLAN is connected to multiple mobile networks.

SUMMARY OF THE INVENTION

The present invention relates to an optimized interaction method of a WLAN user terminal selecting an access mobile communication network. In this method, after a wireless connection between the WLAN user terminal and a WLAN access network is established, the WLAN access network or the WLAN user terminal initiates an access authentication procedure, and the WLAN access network sends a user identity request message to the WLAN user terminal. After receiving the user identity request message, the WLAN user terminal determines network selection information to be currently carried according to a detecting result of whether the WLAN access network is changed or according to user selection information, and returning a message containing the determined network selection information to the WLAN access network. The WLAN access network then judges whether the network selection information in the received message indicates one of the mobile communication operation networks to which the WLAN access network is currently connected; if so, the WLAN access network sends an access authentication request from the WLAN user terminal to a mobile communication operation network indicated in the network selection information, otherwise, the WLAN access network sends a notification signaling to the WLAN user terminal, the WLAN user terminal completes subsequent operations according to contents in the notification signaling.

In the present invention, when sending an access authentication request containing WLAN user terminal's network selection information to a WLAN access network, the WLAN user terminal determines network selection information to be currently carried according to the detected change of WLAN access network or according to the user's setting. If the user needs to switch to another mobile communication operation network, new network selection information will be sent to the WLAN access network; otherwise, the network information used in the previous successful access will be utilized. In this way, it is guaranteed that a roaming user can select a mobile communication operation network to access timely and accurately, which avoids the WLAN user terminal from repeatedly selecting the access network on each access and thus optimizes access procedure of the WLAN user terminal.

DETAILED DESCRIPTION OF THE INVENTION

Figure 1:
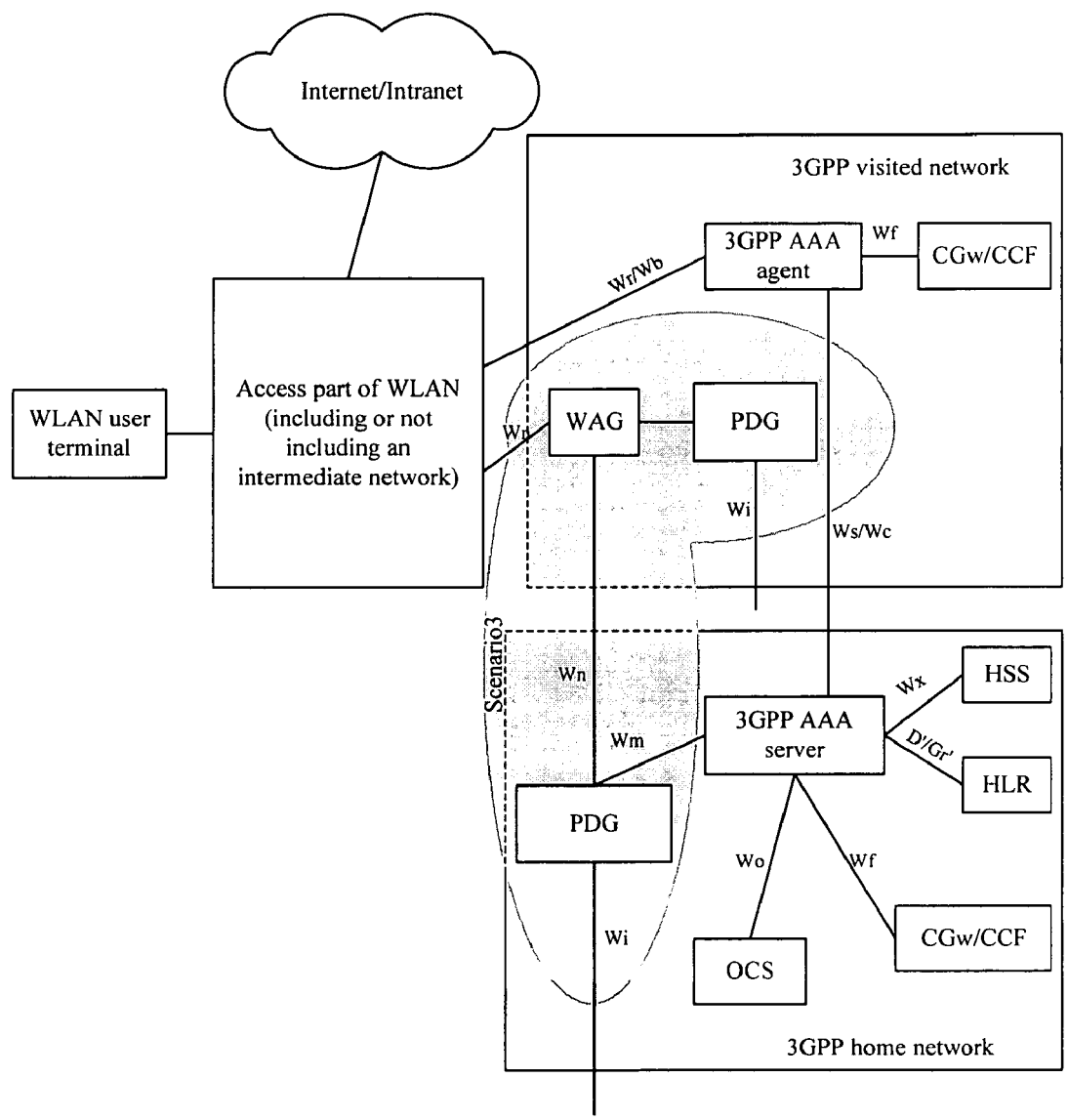
FIG. 1 is a schematic diagram illustrating the framework for intercommunication between a WLAN system and a 3GPP system in case of roaming.
Figure 2:
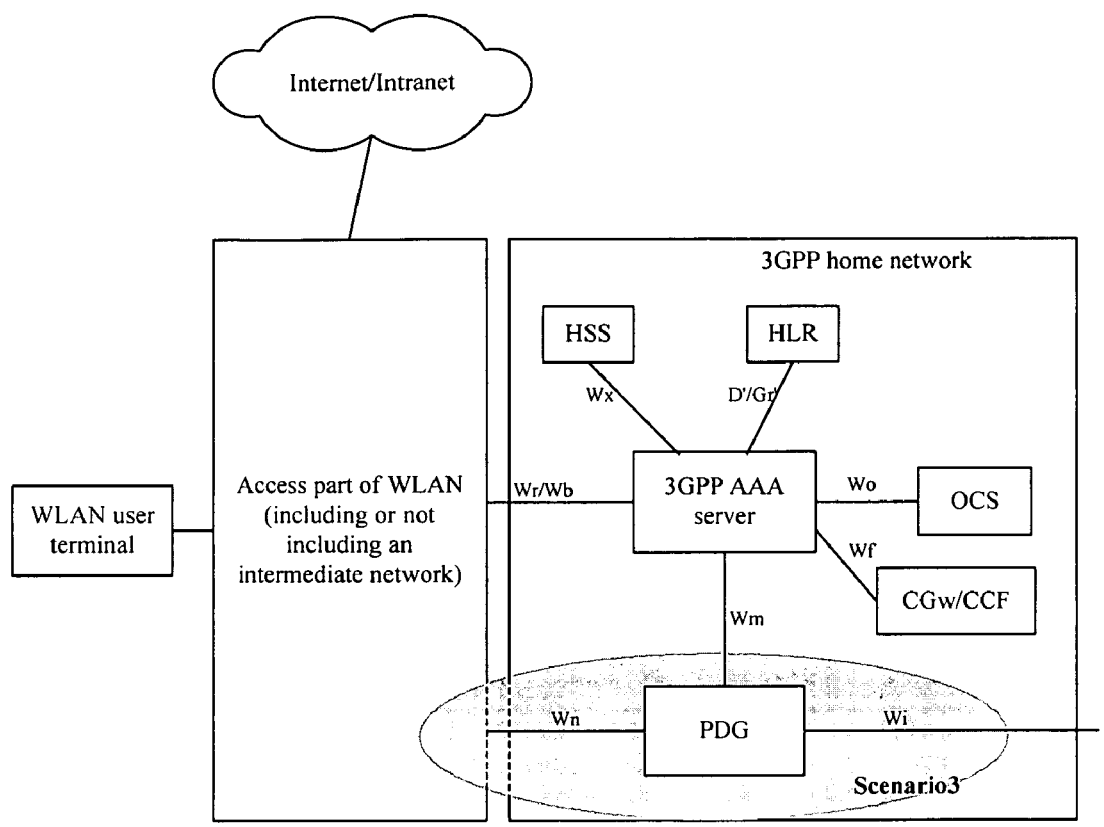
FIG. 2 is a schematic diagram illustrating the framework for intercommunication between a WLAN system and a 3GPP system in case of non-roaming.

The basic idea of embodiments of the present invention is: when being implemented access authentication, a WLAN user terminal judges whether the currently located WLAN access network is changed or whether the user wants to change the mobile communication operation network to be accessed previously, if so, the WLAN user terminal will transmit new network selection information to the WLAN access network by means of an access authentication request; otherwise, the WLAN user terminal will continue to send the information of the network which is successfully accessed last time or is set as the highest priority to access as the network selection information to the WLAN access network. According to the network selection information carried in the access authentication request, the WLAN access network identifies the mobile communication operation network to which the WLAN user terminal wants to access, and connects the current WLAN user terminal to the selected network for access authentication and subsequent operations. Thus, it is guaranteed that a WLAN user terminal is capable of selecting the optimal mobile communication operation network to access by adopting an optimized process.

Here, the network selection information means information of a mobile communication operation network that the WLAN user terminal wants to access currently and that is connected to the WLAN. This selection information can be either preset by the WLAN user terminal or be selected by the WLAN user terminal according to selection information of mobile communication operation networks advertised by the network. This network selection information can be set either inside an individual field in the access authentication request or inside the user identification field with the format of Network Access Identifier (NAI) in the access authentication request.

In the embodiments, a WLAN user terminal transmits new network selection information to a WLAN access network in two situations: one is when the currently located WLAN network is changed, the judgment being made generally based on the detected WLAN access identification information, such as Service Set Identifier (SSID) or Access Point Identifier (APID) or MAC address of access point, or other identification information advertised by the WLAN access network, such as information used to indicate service area, service provider, service provider brand, geological location and so on. If a WLAN user terminal changes its location and enters a new WLAN access network, SSID, APID or MAC address of access point corresponding to the WLAN user terminal will be changed. Generally speaking, one SSID is corresponding to at least one WLAN Internet Service Provider (WISP), and for each WISP, the PLMNs connected to it and having roaming relation with it are basically definite, so it is satisfying to select the optimal mobile communication operation network according to judgment upon SSID. But in some cases, the WLAN networks with the same SSID may be connected to different PLMNs due to different geological locations. The user is free to adopt SSID or APID or MAC address of access point or other detection parameters for judgment by configuring relevant parameters. The other situation is when the user actively resets the information, namely the user changes selection information. In other words, even if the WLAN in which the WLAN user terminal is currently located has no change, the user can still reselect an optimal mobile communication operation network to access currently according to requirements such as quality of service.

Figure 3:
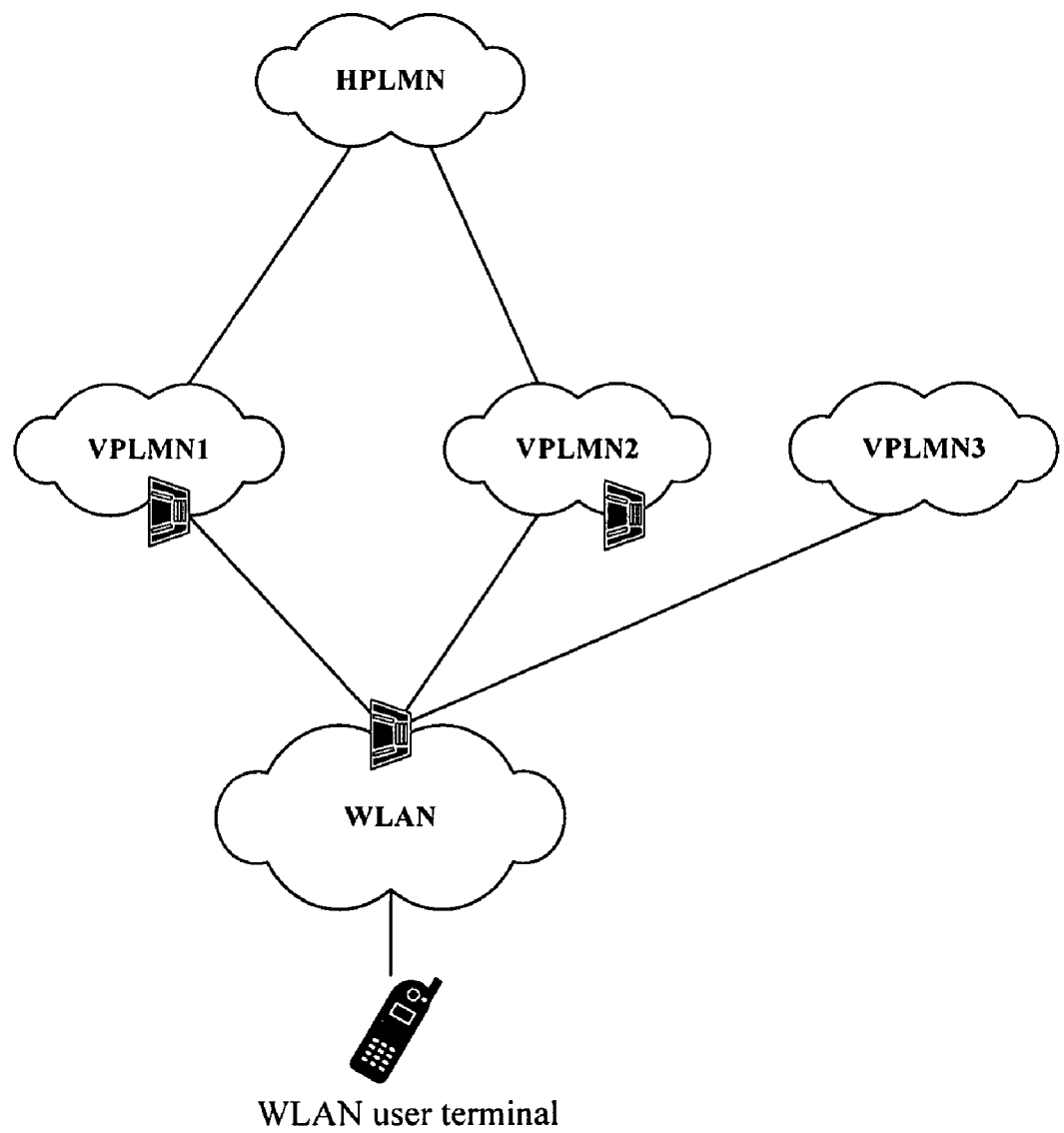
FIG. 3 is a schematic diagram illustrating network structure of the connection between a WLAN and multiple visited networks.
Figure 4:
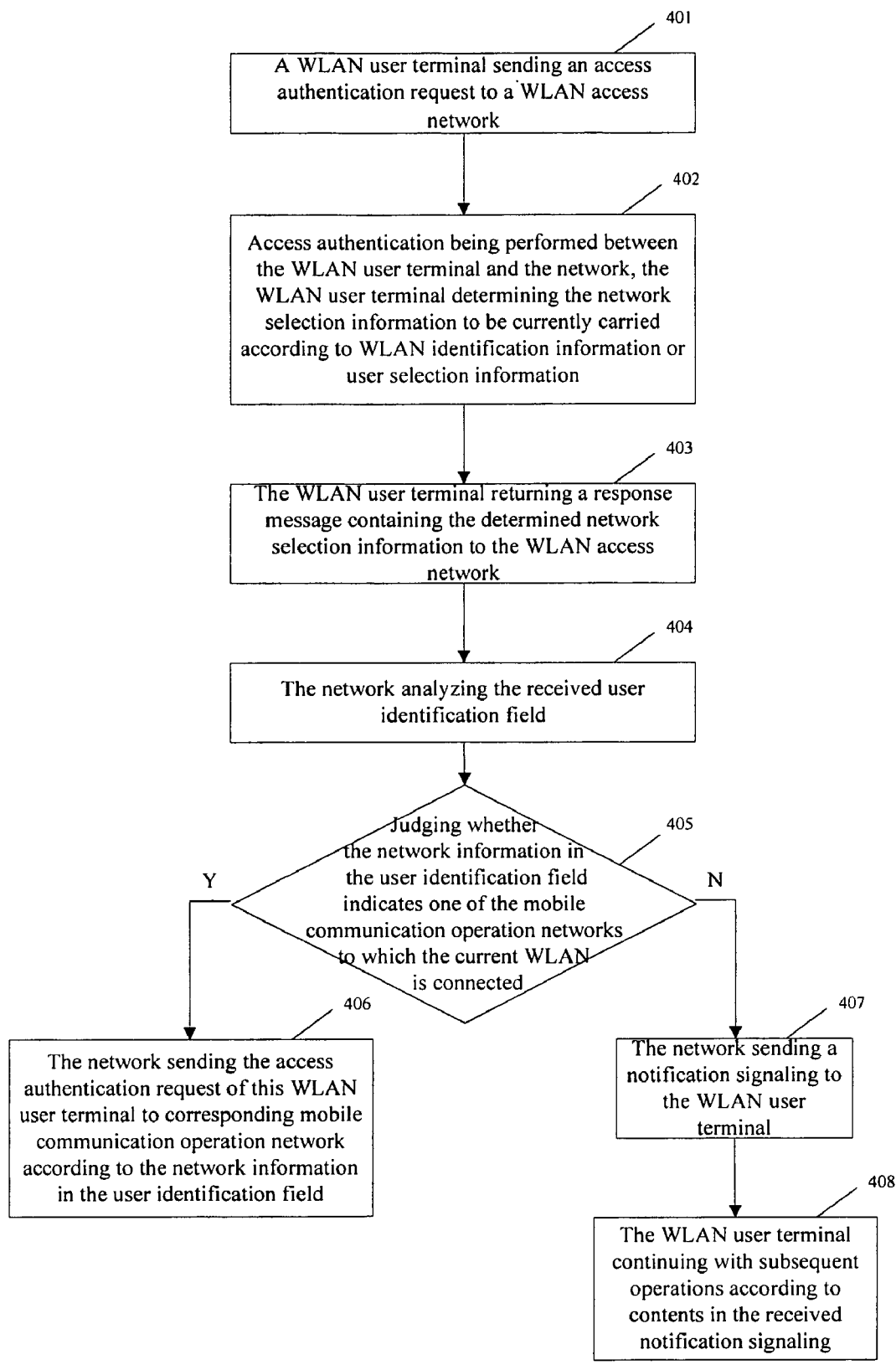
FIG. 4 is a schematic flowchart illustrating optimized interaction process of a WLAN user terminal selecting an optimal access mobile network according to the present invention.

Based on the network structure shown in FIG. 3, the optimized interaction process of a WLAN user terminal selecting information of a mobile communication operation network, as shown in FIG. 4, includes the following steps:

Step 401: when a WLAN user terminal is being accessed to a 3GPP-WLAN intercommunication network via a WLAN, the WLAN user terminal or the network initiates an access authentication procedure. Assuming that the WLAN user terminal initiates the access authentication procedure hereinafter, the WLAN user terminal firstly sends an access authentication request to the WLAN access network.

Steps 402~403: after the WLAN access network has received the request, the access authentication procedure between the WLAN access network and the WLAN user terminal will be started, namely an Extendable Authentication Protocol (EAP) procedure will be started. Specifically speaking, the WLAN access network sends a user identification request message to the WLAN user terminal, requesting for user identity of the current WLAN user terminal; after receiving this request, the WLAN user terminal determines network selection information according to the judgment of whether the current detected WLAN access network is changed or whether user selection information is changed, and then sends a user identification response message containing network selection information to the WLAN access network, as shown in steps 502 and 503 of FIG. 5. This network selection information can be located in user identification field of NAI format, which will be taken as the example hereinafter. The user identification field includes two parts: user identity and domain identity. Here, user selection information means relevant network information input or set by the user when he actively selects the mobile communication operation network to be accessed.

Here, there are three ways for determining network selection information as follows: 1) selecting and determining a new mobile communication operation network according to the change of WLAN access identification information, such as SSID or APID or MAC address of AP; 2) according to the selection information input by the user; 3) according to the preset mobile communication operation network with the highest access priority which can be taken as an initial selected network and can be the home mobile communication operation network of the current WLAN user terminal.

The judgment of whether the WLAN access network is changed is to compare SSID or APID or MAC address of AP of the location where the current detected WLAN user terminal is located with that stored in the WLAN user terminal. In case of differentiating different WLAN access networks according to the detected SSID, the WLAN user terminal detects SSID corresponding to the current WLAN access network, and judges whether SSID and network selection information is stored in itself; if so, comparing the detected SSID with the SSID stored in itself; if they are the same, determining the stored previous network selection information as the current network selection information; if they are not the same, taking information of the mobile communication operation network with the highest access priority as the current network selection information. In contrast, if no SSID is stored, information of the mobile communication operation network with the highest access priority will be taken as the current network selection information.

In the above-noted procedure of determining network selection information, if the detected SSID is the same as the SSID stored in itself, the WLAN user terminal may further judge whether the mobile communication operation network with the highest access priority is reset according to user selection information, if so, taking the latest reset information of the mobile communication operation network with the highest access priority as the current network selection information and sending it to the WLAN access network.

Certainly, it can be directly judged in step 403 whether the user selection information is changed, namely whether the user has reset the mobile communication operation network with the highest access priority, if so, taking the latest reset information of the mobile communication operation network with the highest access priority as the current network selection information and then sending it to the WLAN access network; otherwise, continuing to utilize the previous successfully accessed mobile communication operation network, or further judging whether the currently detected SSID is changed. If it is changed, the preset mobile communication operation network with the highest access priority will be adopted; otherwise, the previous successfully accessed mobile communication operation network will be adopted.

The user can reselect a new mobile communication operation network as the optimal mobile communication operation network to access at any time on need, for instance, under the condition that SSID or APID or MAC address of AP is not changed, the WLAN user terminal can be prompted periodically whether optimization of network selection is required, namely whether it is needed to reselect a better mobile communication operation network than the current one to access.

An effective life span can be set for the stored network selection information. If the current WLAN access network where this WLAN user terminal is located is not changed during the effective life span, this stored network selection information will be adopted right along; if the effective life span is over, the WLAN user terminal will re-determine network selection information according to WLAN access identification information. In this way, it is further guaranteed that the WLAN user terminal can select the optimal mobile communication operation network to access. For example, when a WLAN user terminal is accessed to a mobile communication operation network via WLAN access network A at a certain moment, WLAN access network A is connected to just mobile communication operation networks A and B, after a certain period of time, this WLAN user terminal is still located in WLAN access network A, but WLAN access network A is connected to mobile communication operation networks A, B and C and mobile communication operation network C is the optimal one for this WLAN user terminal; or, the user's geological location is changed and the WLAN service provider in the new geological location is not changed, but the WLAN access network is connected to two more mobile communication operation networks C and D due to geological location difference. Under these situations, if no effective life span is set, the WLAN user terminal may not be able to select the optimal network if the located WLAN access network is not changed. In contrast, by setting an effective life span, the WLAN user terminal will get an opportunity to select the optimal network.

Each time the stored previous network selection information is updated, this effective life span will be reset in the WLAN user terminal. In contrast, when the stored previous network selection information is not updated, the effective life span will be continuously consumed by means of either time-decreasing manner or time-increasing manner. Furthermore, if the current WLAN user terminal is successfully accessed by means of network reselection procedure by utilizing the information sent by the network, even if the network information utilized in the current successful access is the same as the network selection information stored in the WLAN user terminal and the stored network selection information is not updated, the effective life span will be reset.

Here, the stored previous network selection information can be information of one mobile communication operation network, or a mobile communication operation network list. When the stored network selection information is a list, volume of the list can be set by the user or determined by the terminal performance. The procedure of updating the stored network selection information includes: judging whether the list space is used up, if so, deleting the oldest network selection information record and adding a new network selection information record.

The value of the effective life span can be set and changed by the user, for instance, if the user will stay in a roaming country for 5 days and the accessed network will not be changed every day or the location to stay will not be changed a lot, the user can set the effective life span for storing previous network selection record as 1 day. In such a case, the user accesses network at a relatively fixed place and needs to select a network only once, and there will be a certain delay for the access time. Alternatively, the user can directly set the effective life span as 5 days. In such a case, after selecting a network for the first time when arriving in the roaming country, the user does not need to select a network unless the access network is changed, so that the access procedure is greatly optimized.

Steps 404~405: after receiving the response message containing the network selection information, the WLAN access network analyses the user identification field in this response message, and judges whether the network selection information contained in the user identification field is information of the mobile communication operation network to which the current WLAN is connected, if so, executing step 406; otherwise, namely the WLAN cannot identify the mobile communication operation network indicated by the information contained in the network selection information, executing step 407.

Step 406: according to the network selection information in the user identification field with NAI format, the mobile communication operation network to be accessed by the current WLAN user terminal is determined, the WLAN access network sends the access authentication request of the current WLAN user terminal to the mobile communication operation network indicated by the network selection information for access authentication.

Figure 5:
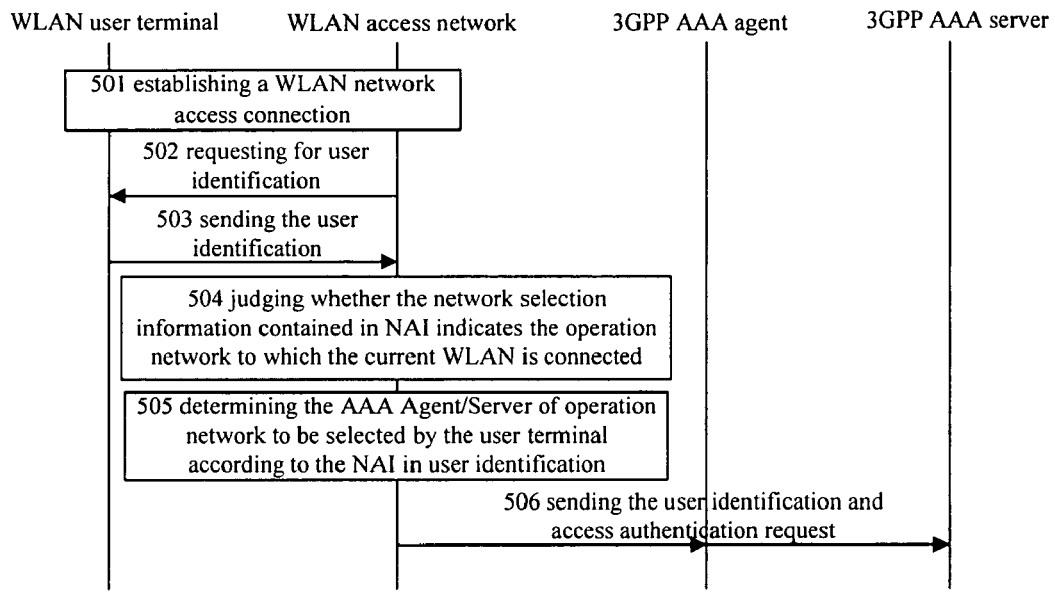
FIG. 5 is a flowchart illustrating access authentication and authorization for a WLAN user terminal according to the present invention.

Here, if the WLAN access network detects that visited network information is included according to the network selection information contained in the user identification field, according to information of the visited network contained in the user identification field, the WLAN access network will send the access authentication request to an Authentication Authorization Accounting Proxy (AAA Proxy) of the visited network to which this WLAN user terminal is affiliated, and then this AAA Proxy will forward the access authentication request to a 3GPP AAA server of the home network to which this WLAN user terminal is affiliated for access authentication; otherwise, according to the network selection information contained in the user identification field, the WLAN access network sends the access authentication request to an AAA server of the home network to which this WLAN user terminal is affiliated for access authentication, as shown in step 506 of FIG. 5. Here, after receiving the access authentication request from the WLAN user terminal and detecting that the user identification field contains visited network information meanwhile the visited network information is local information, the AAA Proxy of visited network modifies the part of domain identity in the user identification field so that only home network domain identity is included, and then sends the modified request to the home network of the WLAN user terminal.

If the WLAN network where the WLAN user terminal is currently located is directly connected to the home network of this WLAN user terminal, while this WLAN user terminal initiates an access authentication request using a roaming identifier, namely the contained network selection information includes visited network information, the current network can directly modify the visited network information in the user identification field with NAI format to home network information. Alternatively, the current network can send a notification to this WLAN user terminal, prompting the user that the current located network is the user's home network. If the WLAN user terminal reinitiates an access authentication request using home network information, the current network will directly complete access authentication procedure; but if the WLAN user terminal still insists on selecting a roaming network, the current network will perform access authentication for this WLAN user terminal and provide subsequent services via the roaming network.

Steps 407~408: the network side sends a notification signaling to the current WLAN user terminal which will continue with subsequent operations according to contents of this notification signaling. Here, the notification signaling can directly be notification message EAP-Request/Notification in WLAN protocol, or be a singly set notification signaling. The notification signaling sent to the WLAN user terminal from the network can be either of the two situations: for one situation, the notification signaling directly includes information of the mobile communication operation network to be advertised by the network, so that the WLAN user terminal or the user can directly implement selection; for another, this notification signaling is used to only notify the WLAN user terminal that the current selected mobile communication operation network information is invalid and instruct the WLAN user terminal to download mobile communication operation network information.

As for the first situation, since this notification signaling includes information of the mobile communication operation network to which the current WLAN is connected, the WLAN user terminal can reselect a mobile communication operation network after receiving this notification signaling, and obtain the network information corresponding to this selected mobile communication operation network according to network information in this notification signaling. Then the WLAN user terminal puts information of the selected mobile communication operation network in user identification field with NAI format in the response message, and then sends the response message to the WLAN access network for judgment before returning to step 403. Here, the network can wait for WLAN user terminal's selection response after sending the notification signaling. In such a case, the network will actively issue a selection result request to the WLAN user terminal if not receiving a response after waiting for a period of time. Alternatively, the network can end the current procedure without waiting for WLAN user terminal's selection response after sending the notification signaling, and the WLAN user terminal will reinitiate the second access authentication procedure.

As for the second situation, after receiving the notification signaling, the WLAN user terminal can automatically select or instruct the user to select whether to download mobile communication operation network information. Here, the automatic selection by the WLAN user terminal means that the WLAN user terminal can automatically process the information advertised by the network according to the user's preset parameters, automatically select a proper mobile communication operation network. If necessary, the WLAN user terminal displays the information to the user for choice by the user, such as popping up a menu item for the user to select a proper network. In the case of displaying information to the user, the WLAN user terminal can implement judgment and selection so as to display information of the network that has roaming relationship with the user's home network. If it is needed to download mobile communication operation network information, the WLAN user terminal will return a response to the network indicating the WLAN user terminal needs download network information; after receiving this response, the network will advertise mobile communication operation network information to this WLAN user terminal. After obtaining the mobile communication operation network information, the WLAN user terminal will reselect a mobile communication operation network and reinitiate an access authentication request using new network selection information before returning to step 403. If there is no need to download mobile communication operation network information, the WLAN user terminal performs no process or returns a response message of no download need. Here, the network can wait for WLAN user terminal's selection response after advertising the notification signaling. In such a case, the network will actively advertise mobile communication operation network information to the WLAN user terminal if not receiving a response after waiting for a period of time. Alternatively, the network can end the current procedure without waiting for WLAN user terminal's selection response after advertising the notification signaling, and the WLAN user terminal will actively send a request so as to initiate a network information download procedure if needing download of network information.

In the above two situations, the mobile communication operation network information provided to the WLAN user terminal for selection by the network is stored in a special network information storage unit. The mobile communication operation network information generally includes the following parameters: network identity, network Quality of Service (QOS), bandwidth, service quality, available WLAN scenario conditions, charging condition, service category and so on. When advertising information of the mobile communication operation network to which the current WLAN is connected, the network can select information of a visited network that has roaming relation with the home network indicated by the current WLAN user terminal. If there is no such a visited network, the network can choose either to not advertise the information or notify the user that there is no roaming relation.

After being successfully accessed, the WLAN user terminal will update the stored SSID as the current detected SSID and update the stored network selection information as the network information of the newly selected network. Of course, if it is the previous network selection information stored in the WLAN user terminal that is adopted for the current access, there is no need to update the stored information.

As for a roaming user in terms of the above scheme, if the WLAN access network where this roaming WLAN user terminal is located is changed or the user himself wants to change the mobile communication operation network to be accessed currently, the roaming WLAN user terminal will select an optimal mobile communication operation network to access in time, and store the current identification information and network selection information after each successful access. In contrast, if this roaming WLAN user terminal does not need to reselect a network, it will continue to use the previous successfully accessed mobile communication operation network, so that such procedure as sending selectable network information to the WLAN user terminal can be omitted, and access procedure can be optimized.

In the above scheme, the judgment for network selection information in step 405 and the transmission of notification information in step 407 can be implemented by the same network entity, which can be called network information judging and notification sending unit. This network information judging and notification sending unit can be placed in a WLAN access network, such as in an Access Control (AC) equipment, or can be placed outside of the current WLAN access network and inside a certain mobile communication operation network which is connected to the current WLAN access network, such as an AAA server, serving for multiple WLAN access networks simultaneously. Alternatively, a default AAA Proxy can also be preset as the network information judging and notification sending unit.

In the above-noted schemes, if it is the WLAN user terminal that initiates access authentication procedure, while the WLAN user terminal cannot determine the mobile communication operation network to be selected during the access authentication procedure, the WLAN user terminal can send a request for downloading information of the mobile communication operation network to which the current WLAN is connected before or while sending access authentication request or during the access authentication procedure. In other words, the WLAN user terminal can initiate the access authentication procedure after obtaining the mobile communication operation network information and selecting a network. Alternatively, the procedure of downloading network information and that of access authentication can be performed concurrently. Here, the WLAN can send the request for downloading network information by adopting EAP signaling or Portal interaction manner. This WLAN user terminal can also send the request for downloading information of the mobile communication operation network to which the current WLAN is connected after receiving the user identification request message from the WLAN access network. In such a case, the request can be sent as an independent signaling, or the request identification can be placed in the user identification response message, for instance, response user identity being null while the preset download request field being set, or directly regulating to download network information if response user identity is 0xFFF.

Figure 6:
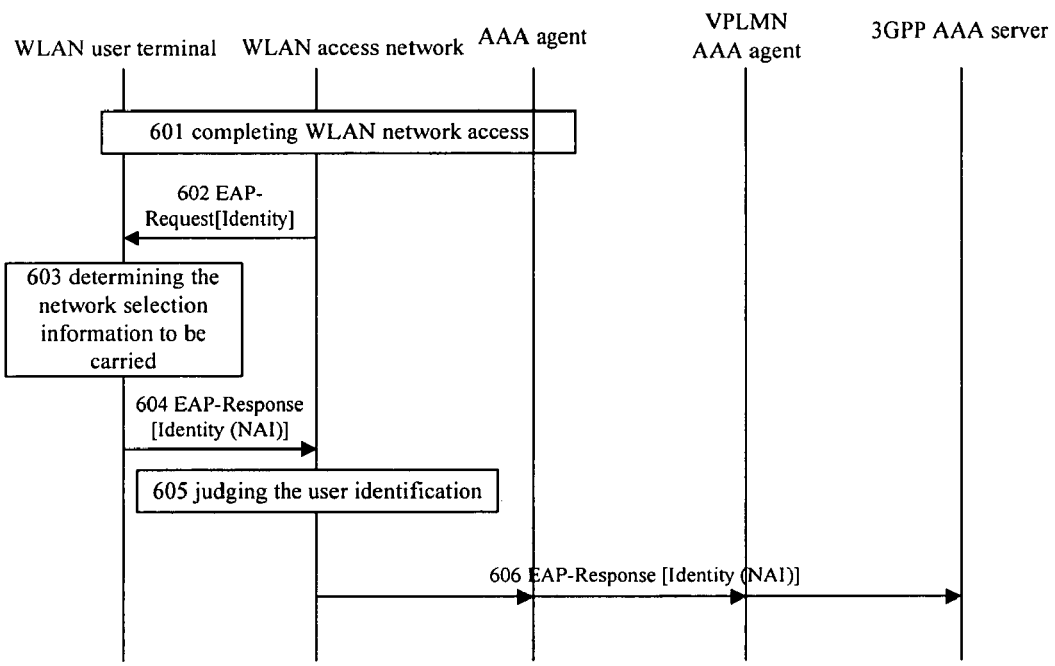
FIG. 6 is a flowchart illustrating optimized interaction process of a WLAN user terminal selecting an optimal access mobile network according to an embodiment of the present invention.

FIG. 6 is a flowchart illustrating optimized interaction process of a WLAN user terminal selecting an optimal access mobile network according to an embodiment of the present invention. The premise of this embodiment is that: in a 3GPP-WLAN interaction network, the current WLAN user terminal was successfully accessed to mobile communication operation network A last time and stores information of mobile communication operation network A as well as SSID of the previous WLAN access network where the WLAN user terminal is located, and that this WLAN user terminal does not change to enter another WLAN access network, whether the WLAN access network is changed is judged according to SSID, or according to APID, MAC address of AP and other parameters in terms of practical condition. As shown in FIG. 6, the optimized interaction procedure of a WLAN user terminal selecting a mobile communication operation network includes the following steps:

Steps 601~602: after a wireless connection is established between a WLAN user terminal and a WLAN access network, this WLAN user terminal sends an access authentication request to the WLAN access network. After receiving this request, the WLAN access network sends a user identity request message (EAP-Request [Identity] message) to this WLAN user terminal.

Steps 603~604: after receiving the EAP-Request [Identity], this WLAN user terminal detects SSID of the current WLAN and compares it with the SSID stored in itself. Here, the current detected SSID is the same as the stored one because the WLAN where this WLAN user terminal is located is not changed. Then, the WLAN user terminal directly determines network information of mobile communication operation network A as the network selection information to be currently carried.

Then, this WLAN user terminal sends a user identity response message (EAP-Response [Identity] message) containing user identification field with NAI format to the WLAN access network, the user identification field containing network information of mobile communication operation network A.

Steps 605~606: according to the user identification field in the received message, the WLAN access network determines the mobile communication operation network to be accessed by this WLAN user terminal, and directly sends the access authentication request information to AAA Proxy and AS of mobile communication operation network A for access authentication process.

If the current access is successful, since the current WLAN user terminal adopts the stored previous network selection information, there is no need to update the current stored SSID and previous network selection information. Moreover, if an effective life span is set for this stored previous network selection information, this effective life span will continue to be consumed.

Figure 7:
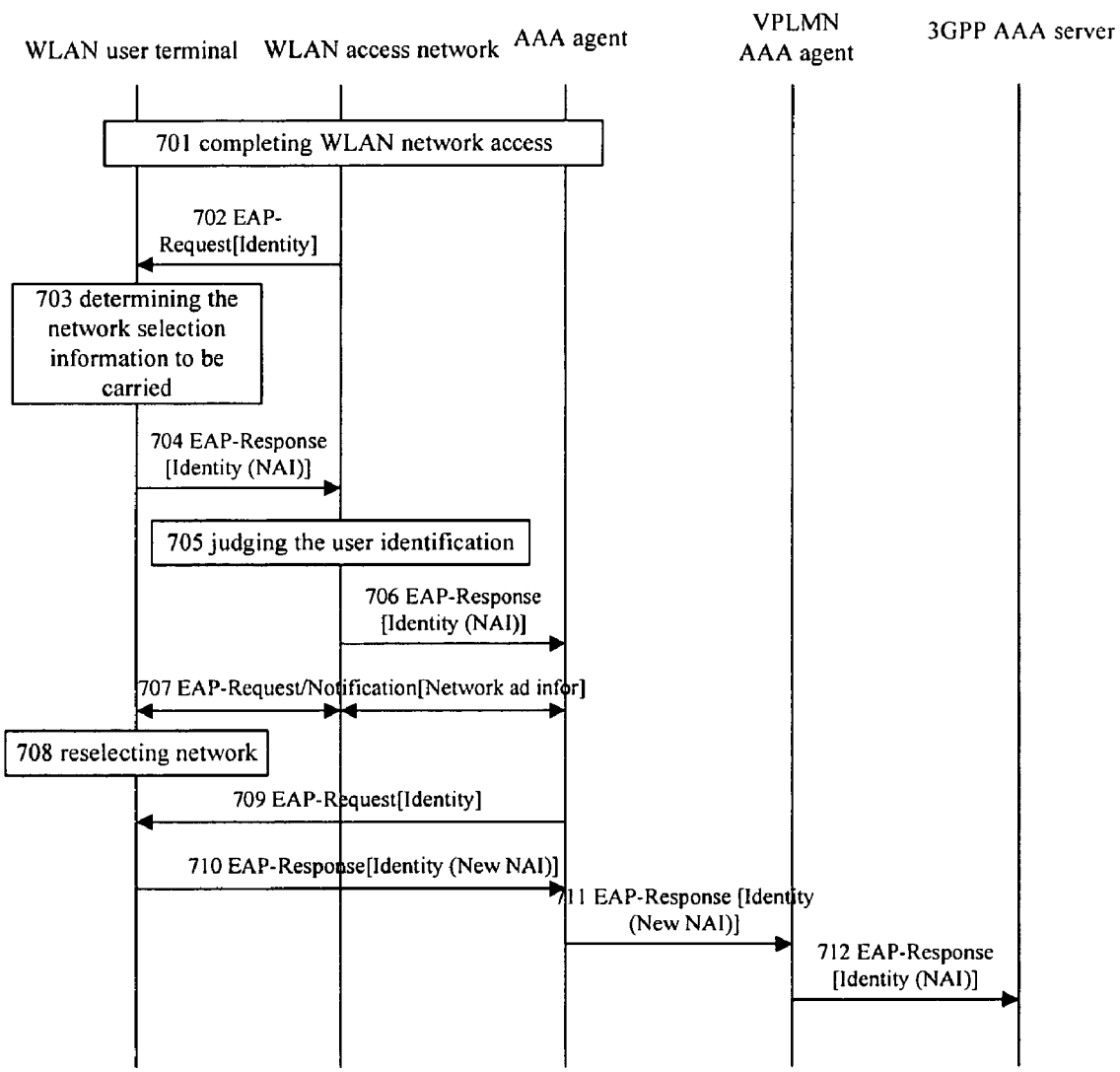
FIG. 7 is a flowchart illustrating optimized interaction process of a WLAN user terminal selecting an optimal access mobile network according to another embodiment of the present invention.

FIG. 7 is a flowchart illustrating optimized interaction process of a WLAN user terminal selecting an optimal access mobile network according to another embodiment of the present invention. The premise of this embodiment is that: in a 3GPP-WLAN interaction network, the current WLAN user terminal was successfully accessed to mobile communication operation network A last time and stores information of mobile communication operation network A as well as SSID of the previous WLAN access network where the WLAN user terminal is located; default optimal network selection information is set, and this WLAN user terminal has roamed out of the previous WLAN access network and entered a new WLAN access network; whether the WLAN access network is changed is judged according to SSID. As shown in FIG. 7, the optimized interaction procedure of a WLAN user terminal selecting a mobile communication operation network includes the following steps:

Steps 701~702: after a wireless connection is established between a WLAN user terminal and a WLAN access network, the WLAN user terminal sends an access authentication request to the WLAN access network. After receiving this request, the WLAN access network sends a user identity request message (EAP-Request [Identity] message) to this WLAN user terminal.

Steps 703~704: after receiving the EAP-Request [Identity], this WLAN user terminal detects SSID of the current WLAN and compares it with the SSID stored in itself. Here, the current detected SSID is different from the stored one because the WLAN where this WLAN user terminal is located is changed, so the WLAN user terminal takes the default optimal network selection information as the network selection information to be currently carried.

Then, this WLAN user terminal sends a user identity response message (EAP-Response [Identity] message) containing user identification field with NAI format to the WLAN access network, the user identification field containing the default optimal network selection information.

Steps 705~706: according to the user identification field in the received message, the WLAN access network determines the routing by which the access authentication request from the WLAN user terminal will be transmitted. As a result, the WLAN access network finds the user identification field uni-identifiable, namely, the user identification field does not belong to any of the mobile communication operation networks connected to it, then this access authentication request will be routed to the default AAA Proxy.

Step 707: after receiving this access authentication request, the default AAA Proxy finds the network selection information does not correspond to any of the mobile communication operation networks connected to the WLAN network, and then sends EAP-Request/Notification signaling to the WLAN access network. The WLAN access network advertises this notification signaling to this WLAN user terminal. According to EAP protocol, after receiving the signaling, both WLAN access network and the user will directly send a response indicating the receipt. The notification signaling contains information of the mobile communication operation network to which the current WLAN is connected. The notification signaling can be sent for once or more, and the interaction will be ended according to indication information of the last EAP message.

Step 708: after receiving the information of the mobile communication operation network contained in the received notification signaling, the WLAN user terminal will reselect a network. Here, the AAA Proxy and the WLAN access network will wait for WLAN user terminal's response after sending the notification signaling.

Steps 709~710: the AAA Proxy advertises an EAP-Request [Identity] signaling requesting for user identification to the current WLAN user terminal again. After receiving the signaling, the WLAN user terminal will return the user identification containing new network selection information by means of EAP-Response [Identity] message.

Steps 711~712: according to the new network selection information sent by the current WLAN user terminal, the WLAN access network determines the mobile communication operation network to be accessed by this WLAN user terminal, namely a VPLMN network to be accessed, and sends the access authentication request to AAA Proxy and AS of the identified VPLMN network for access authentication process.

If the current access is successful, the WLAN user terminal will judge whether information of the current successfully accessed mobile communication operation network is the same as the previous network selection information stored in itself. If they are different, the WLAN user terminal will update the stored previous network selection information with information of the current successfully accessed mobile communication operation network, otherwise, the WLAN user terminal will not update the stored previous network selection information. Moreover, if an effective life span is set for this stored previous network selection information, this effective life span should be reset if the stored previous network selection information is updated. Moreover, this effective life span should still be reset if the stored previous network selection information is not updated, because the network selection information for the current access is reselected and there is a procedure of acquiring information from the network and reselecting a network.

According to user's practical application environment requirements, the above mentioned optimized interaction procedure can be adopted together with the conventional network selection schemes. For instance, the user can preset an effective life span for utilizing this optimized method, in such a case, network selection and access is implemented with the above-mentioned optimized scheme during this effective life span, while the conventional method in which the preset optimal network selection is carried in each access is adopted after this effective life span is over. Or, the user can choose to utilize the above-noted optimized interaction method in case of roaming or locations being changed frequently, while in case of non-roaming, the user can choose the scheme in which the preset optimal network selection is carried in each access.

Therefore, it is appreciated that the foregoing description is a demonstration of the rather than limitation to the present invention.

The invention claimed is:

1. An optimized interaction method of a Wireless Local Area Network (WLAN) WLAN user terminal selecting an access mobile communication network, comprising the steps of:
   a. after a wireless connection between the WLAN user terminal and a WLAN access network is established, the WLAN access network or the WLAN user terminal initiating an access authentication procedure, and the WLAN access network sending a user identity request message to the WLAN user terminal;
   b. after receiving the user identity request message, the WLAN user terminal determining network selection information to be currently carried according to a detecting result of whether the WLAN access network is changed or according to user selection information, and returning a message containing the determined network selection information to the WLAN access network; and
   c. the WLAN access network judging whether the network selection information in the received message indicates one of the mobile communication operation networks to which the WLAN access network is currently connected; if so, the WLAN access network sending an access authentication request from the WLAN user terminal to a mobile communication operation network indicated in the network selection information, otherwise, the WLAN access network sending a notification signaling to the WLAN user terminal, the WLAN user terminal completing subsequent operations according to contents in the notification signaling.

2. The method according to claim 1, further comprising the step of presetting a mobile communication operation network with the highest access priority in the WLAN user terminal.

3. The method according to claim 2, wherein in step b, whether the WLAN access network is changed is judged according to WLAN access identification information, wherein the step of determining the network selection information comprises the steps of:
   b1. the WLAN user terminal detecting identification information of the WLAN where the WLAN user terminal is currently located, judging whether WLAN access identification information and previous network selection information is stored in itself, if so, executing step b2; otherwise, executing step b3;
   b2. judging whether the currently detected WLAN access identification information is the same as that stored in itself; if so, taking the previous network selection information stored in itself as the network selection information to be currently carried and ending the current flow; otherwise, executing step b3; and b3. taking the information of the mobile communication operation network with the preset highest access priority as network selection information to be currently carried.

4. The method according to claim 3, further comprising the steps of: after being successfully accessed to the mobile communication operation network indicated in the network selection information, the current WLAN user terminal updating the WLAN access identification information stored in itself with the currently detected WLAN access identification information, judging whether information of the current successfully accessed mobile communication operation network is the same as the previous network selection information stored in itself; if they are different, updating the previous network selection information stored in itself with information of the current successfully accessed mobile communication operation network, otherwise, not updating the previous network selection information stored in itself.

5. The method according to claim 4, wherein before the step of judging whether information of the current successfully accessed mobile communication operation network is the same as the previous network selection information stored in itself, the method further comprises the steps of: judging whether information of the current successfully accessed mobile communication operation network is the same as that of the mobile communication operation network with the preset highest access priority, if they are different, executing the step of judging whether information of the current successfully accessed mobile communication operation network is the same as the previous network selection information stored in itself; otherwise, updating the previous network selection information stored in itself.

6. The method according to claim 5, further comprising the step of: after the stored network selection information is updated, setting an effective life span for the current stored previous network selection information, the effective life span being used to set the stored content as invalid after timeout.

7. The method according to claim 6, wherein when the WLAN access network is not changed, the method further comprises the steps of: judging whether the effective life span of the previous network selection information stored in itself is timeout, if so, taking the information of the mobile communication operation network with the preset highest access priority as the network selection information to be currently carried; otherwise, continuing to take the previous network selection information currently stored in itself as the network selection information to be currently carried, and the effective life span continuing to be consumed.

8. The method according to claim 7, wherein the stored previous network selection information is a mobile communication operation network list.

9. The method according to claim 8, wherein the step of updating the previous network selection information stored in itself further comprises the steps of: judging whether the list space is full, if so, deleting the oldest network selection information record in the list and adding new network selection information record; otherwise, directly adding new network selection information record.

10. The method according to claim 6, wherein after being successfully accessed to the mobile communication operation network indicated by the network selection information, the method further comprises the steps of: judging whether information of the current successfully accessed mobile communication operation network is the same as the previous network selection information stored in itself; if they are different, after updating the previous network selection information stored in itself, resetting the effective life span of the currently stored previous network selection information, if they are the same, judging whether the current WLAN user terminal is accessed successfully using the previous network selection information stored in itself, if so, not updating the previous network selection information stored in itself and continuing to consume the effective life span, otherwise, not updating the previous network selection information stored in itself and resetting the effective life span of the network selection information.

11. The method according to claim 4, further comprising the step of: after the stored network selection information is updated, setting an effective life span for the current stored previous network selection information, the effective life span being used to set the stored content as invalid after timeout.

12. The method according to claim 11, wherein when the WLAN access network is not changed, the method further comprises the steps of: judging whether the effective life span of the previous network selection information stored in itself is timeout, if so, taking the information of the mobile communication operation network with the preset highest access priority as the network selection information to be currently carried; otherwise, continuing to take the previous network selection information currently stored in itself as the network selection information to be currently carried, and the effective life span continuing to be consumed.

13. The method according to claim 12, wherein the stored previous network selection information is a mobile communication operation network list.

14. The method according to claim 13, wherein the step of updating the previous network selection information stored in itself further comprises the steps of: judging whether the list space is full, if so, deleting the oldest network selection information record in the list and adding new network selection information record; otherwise, directly adding new network selection information record.

15. The method according to claim 11, wherein after being successfully accessed to the mobile communication operation network indicated by the network selection information, the method further comprises the steps of: judging whether information of the current successfully accessed mobile communication operation network is the same as the previous network selection information stored in itself; if they are different, after updating the previous network selection information stored in itself, resetting the effective life span of the currently stored previous network selection information, if they are the same, judging whether the current WLAN user terminal is accessed successfully using the previous network selection information stored in itself, if so, not updating the previous network selection information stored in itself and continuing to consume the effective life span, otherwise, not updating the previous network selection information stored in itself and resetting the effective life span of the network selection information.

16. The method according to claim 3, wherein in step b2, when the currently detected WLAN access identification information is the same as the WLAN access identification information stored in itself, step b2 further comprises the steps of: judging whether the user selection information is changed, if so, taking information of the mobile communication operation network with the newly-set highest access priority as the network selection information to be currently carried; otherwise, taking the previous network selection information stored in the WLAN user terminal itself as the network selection information to be currently carried.

17. The method according to claim 3, wherein the mobile communication operation network with the highest access priority is a home network of the current WLAN user terminal.

18. The method according to claim 3, wherein the WLAN access identification information is Service Set Identifier (SSID) or Access Point Identifier (APID) or MAC address of access point.

19. The method according to claim 2, wherein in step b, the step of determining the network selection information further comprises the steps of: judging whether the user selection information is changed, if so, taking information of the mobile communication operation network with the newly-set highest access priority as the network selection information to be currently carried; otherwise, taking the previous network selection information stored in the WLAN user terminal itself as the network selection information to be currently carried.

20. The method according to claim 2, wherein the mobile communication operation network with the highest access priority is a home network of the current WLAN user terminal.

21. The method according to claim 1, wherein the network selection information is placed in a user identification field with Network Access Identifier (NAI) format.

22. The method according to claim 1, wherein in step c, the notification signaling sent to the WLAN user terminal from the network contains mobile communication operation network information to be advertised, and the method further comprises the steps of: after receiving the notification signaling, the WLAN user terminal reselecting a mobile communication operation network, and obtaining network information corresponding to the selected mobile communication operation network according to network information in the notification signaling; and then sending a message containing the new network selection information to the WLAN access network and returning to step c.

23. The method according to claim 21, further comprising the steps of: the network waiting for a response message from the WLAN user terminal after sending the notification signaling, and actively sending a selection result request to the WLAN user terminal if not receiving a response after a period of time.

24. The method according to claim 21, further comprising the steps of: the network ending the current authentication after sending the notification signaling, the WLAN user terminal reinitiating an access authentication procedure to the WLAN access network after reselecting a mobile communication operation network, and sending access authentication information containing the new network selection information.

25. The method according to claim 1, wherein in step c, the notification signaling sent to the WLAN user terminal from the network notifies the WLAN user terminal that the current selected network is invalid and it is needed to download information of mobile communication operation networks, and the method further comprises the steps of: the WLAN user terminal judging whether it is needed to download information of mobile communication operation networks, if so, the WLAN user terminal returning a response indicating needing to download network information to the network; the network advertising information of mobile communication operation networks to the WLAN user terminal after receiving the response; after obtaining information of mobile communication operation networks, the WLAN user terminal reselecting a mobile communication operation network and resending an access authentication request containing new network selection information to the WLAN access network, and returning to step c; otherwise, not implementing any processing or returning a response indicating no need to download.

26. The method according to claim 25, further comprising the steps of: the network waiting for a response message from the WLAN user terminal after sending the notification signaling, and actively advertising information of mobile communication operation networks to the WLAN user terminal if not receiving a response after a period of time.

27. The method according to claim 25, further comprising the steps of: the network ending the current authentication after sending the notification signaling, the WLAN user terminal actively initiating a network information download procedure if needing to download the network information.

28. The method according to claim 25, wherein the WLAN user terminal automatically selects information of mobile communication operation networks advertised by the network according to preset parameters.

29. The method according to claim 22, wherein the WLAN user terminal automatically selects information of mobile communication operation networks advertised by the network according to preset parameters.

* * * * *